Figure 1:
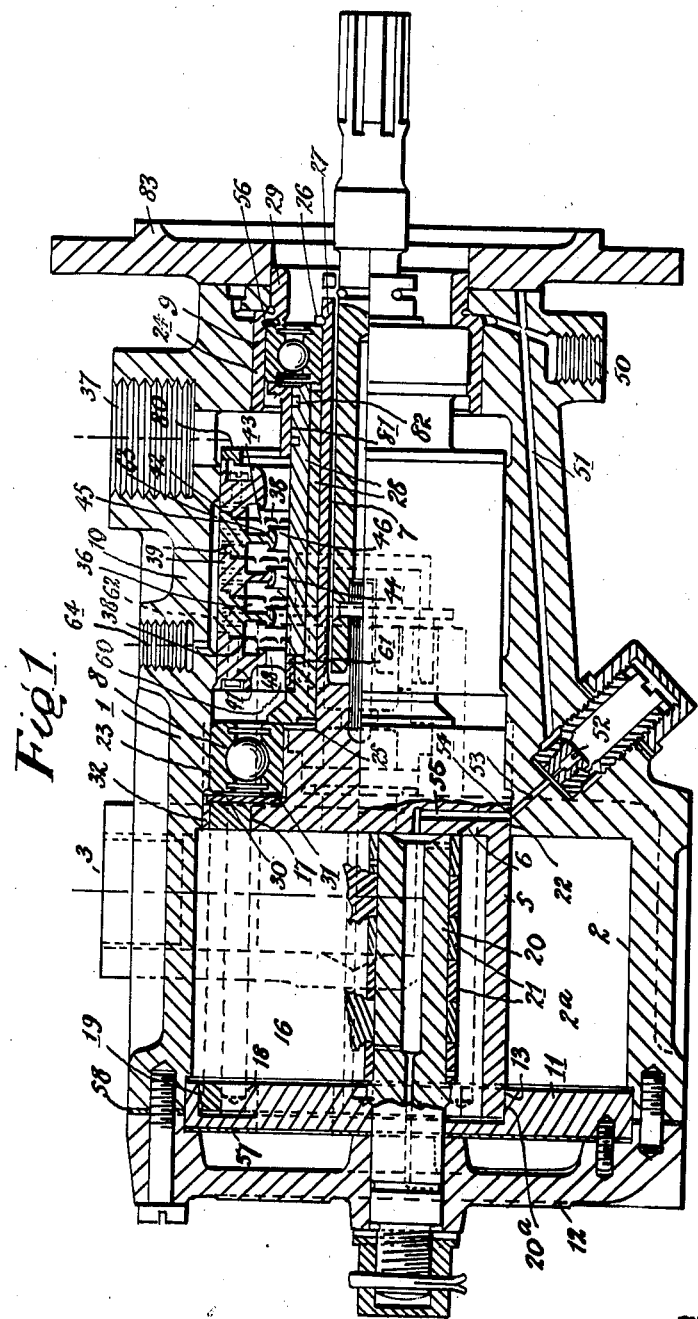

Dec. 14, 1943.    F. C. FULCHER    2,336,477
ROTARY PUMP APPARATUS OF AIRCRAFT
Filed May 13, 1941    3 Sheets-Sheet 1

INVENTOR
Frank Christian Fulcher
BY Albert F. Nathan
ATTORNEY

Dec. 14, 1943.       F. C. FULCHER       2,336,477
ROTARY PUMP APPARATUS OF AIRCRAFT
Filed May 13, 1941       3 Sheets-Sheet 2
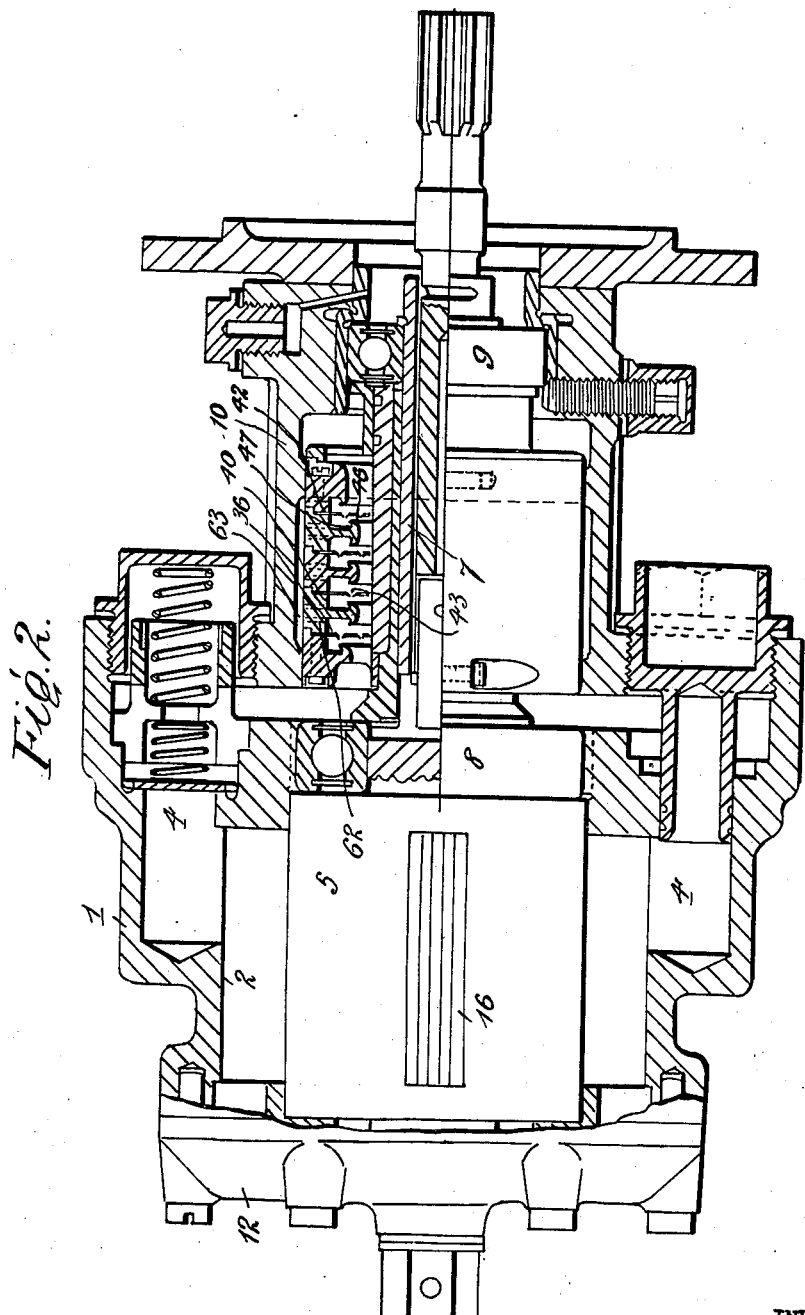
INVENTOR
Frank Christian Fulcher
BY Albert F. Nathan
ATTORNEY Dec. 14, 1943. F. C. FULCHER 2,336,477
ROTARY PUMP APPARATUS OF AIRCRAFT
Filed May 13, 1941 3 Sheets-Sheet 3
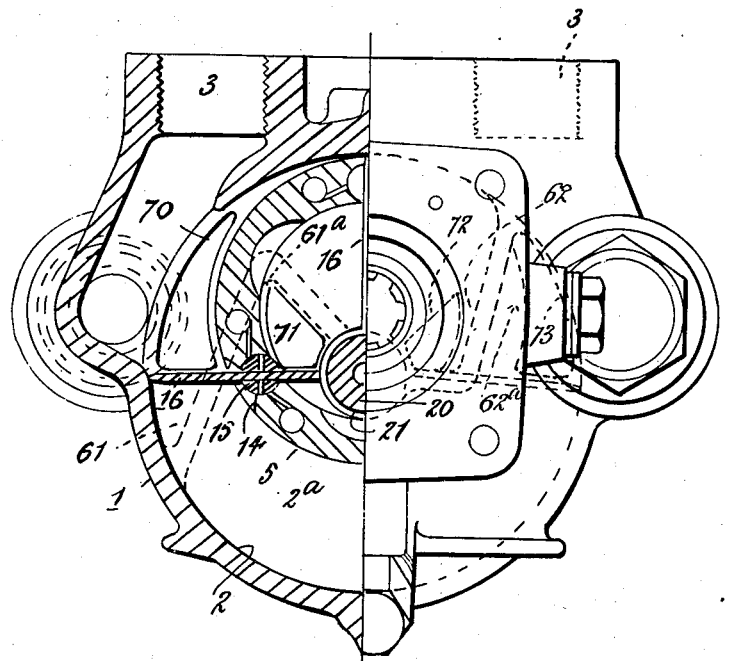
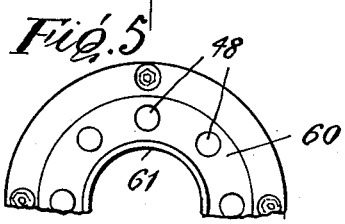
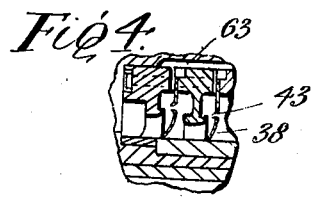
INVENTOR
Frank Christian Fulcher
BY Albert F. Nathan
ATTORNEY Patented Dec. 14, 1943

2,336,477

UNITED STATES PATENT OFFICE 2,336,477

ROTARY PUMP APPARATUS OF AIRCRAFT

Frank Christian Fulcher, Kentsbank, Grange-over-Sands, England

Application May 13, 1941, Serial No. 393,268
In Great Britain May 11, 1940

4 Claims. (Cl. 183—36)

The present invention relates to rotary pumps of aircraft for example in connection with the supplying of compressed air to the inside of aircraft when flying at high altitudes. In high altitude flying the pressure in the crew or passenger accommodating space of the aircraft is liable to become so unduly low as to necessitate a supply of extra air to bring the air within the space to a more comfortable pressure.

For supplying compressed air to the aircraft for this purpose I propose to use a rotary pump having certain features of construction which lend themselves to this use of the pump. It will be appreciated that the size and weight of the pump for this duty must be kept as small as possible and this involves running the pump at a high speed in order to pass a sufficient volume of air for this purpose.

Such a pump must be adequately lubricated, generally by a pressure-feed lubricating system, but the air discharged into the occupied interior of the aircraft must be as far as practicable free from lubricant particles. I therefore introduce an oil separator between the pump and the point of entry of the pressure air into the occupied interior. This however makes more difficult the problem of reducing to the practicable minimum the total size and weight of the cabin supercharging apparatus.

It is a main object of the present invention to provide a supercharging apparatus which will effectively discharge a lubricant-free or substantially lubricant-free air and which will be constructed with the reduction of the size and weight of the apparatus as a main consideration.

Another object of the invention is to bring the apparatus into a unitary structure so as to facilitate its fitting to the aircraft, as well as to contribute to the foregoing object of minimising the weight and bulk of the apparatus.

A further object of the invention is to provide a construction of rotary apparatus which can be run at high speeds with the rotor parts out of contact with the working chamber, thereby to obtain the required input of air by the speed of a small apparatus, rather than by the volume of a large and heavy one; a further object incidental to the high running speed of the apparatus is to avoid heat and wear which would soon have a destructive action on the vital parts by employing very fine clearances which will reduce slippage to a minimum so that the maximum efficiency of the apparatus can be achieved and by constructing the apparatus in such a way as to permit these clearances to be preserved despite the distorting forces to which the apparatus is subjected when running at speed.

While my invention is not restricted to any one form of rotary apparatus—for example it may be employed whether the rotor be borne at one or both ends, and in the former case whether the interior of the rotor barrel is usefully employed or not—I prefer to provide a rotary pump as described and claimed in my prior application Serial No. 330,224, filed April 17, 1940.

In that form of pump, the rotor barrel which is eccentrically mounted in the working cylinder, is supported cantilever fashion by a shaft extending into an extension of the casing, and the barrel, and the vanes, which are supported centrally of the working chamber against centrifuging, run out of contact with the working chamber. As the clearances are very fine the bearings in said extension have to be proportioned so as to maintain the rotor sufficiently rigid to preserve continuity of the clearances despite the high distorting forces to which the unsupported parts in the working chamber are subjected. This involves a certain minimum length of shaft and bearing support which I can turn to great advantage in achieving my present object by reconstructing the porting of the pump in such a way as to provide a passage around the shaft along which the air from the working chamber is compelled to pass and introducing in this passage the separator elements. When the shaft is supported as in my pump aforesaid by spaced ball or roller bearings, there is generally an annular space between these bearings and by appropriately modifying the porting arrangements so as to place this passage in communication with the working chamber with an outlet I can place my separator elements in this passage, and although I sometimes find it convenient to increase the length of the passage in order to obtain the desired length of path of the oil-laden air to enable effective separation to take place, very little extra bulk and weight is involved over the pump per se and that increase in the distance between the bearings which is generally required is in fact of advantage in increasing the rigidity of support of the barrel against the powerful forces tending to deflect it. Apart from such changes as are involved in introducing the separator into the apparatus, the construction of the pump should advantageously be the same as that of my earlier application which has been evolved with similar considerations in mind of saving size and weight by relying upon high speed whilst obtaining the necessary rigidity to preserve during running of the pump at speed the fine clearances which make the pump so efficient. Except to say that the pump I am at present contemplating is one having a displacement of from 75 to 100 cub. feet per minute, and a speed of 800 to 4,500 R. P. M., and these figures may be substantially varied, I do not propose to go more fully into the construction of the pump until the apparatus is described hereinafter in detail.

The extension of the casing may be integral with the cylindrical part of the casing which forms the outer wall of the working chamber and may be bored out centrally to receive the ball or other bearings and the oil separator, while alternative outlet passages from the working chamber may be formed in such extension so as to lead to the central annular passage and a common radial outlet therefrom. The alternative passages may be formed by bores from the working chamber parallel to the axis thereof and short bores at right angles thereto leading to the central passage. It may however, be more convenient in some cases to form the extension in separate parts, e. g., parts secured together by peripheral engagement.

Although I have referred to my apparatus more particularly as a cabin or like supercharger, it may be used for other purposes, e. g., for supplying compressed air, separated from the lubricant, to de-icing equipment, since the access of lubricant to the rubber of such equipment is undesirable.

In order that the invention may be more readily understood, reference is hereinafter made to the accompanying drawings, in which one form of apparatus according to the present invention is illustrated by way of example.

In the drawings, Fig. 1 is a longitudinal sectional elevation of this apparatus, Fig. 2 is a longitudinal view at right angles to Fig. 1 and partly is section, Fig. 3 is an end view, half in section, Fig. 4 is a detail view of a modified form of separator and Fig. 5 is a part view of one of the separator elements.

The form of pump shown comprises a casing 1 containing a working cylinder 2 providing a crescent shaped outer pumping chamber, 2a, having one or more suction ports 3 and discharge ports 4, the rotor comprising a barrel portion 5 with one end open and the other end closed by a wall 6 from which projects an integral shaft portion 7 which is supported by bearings 8, 9 housed in an extension 10 of the casing, this extension being integral with the cylindrical part of the casing 1 providing the outer peripheral wall of the working cylinder. The casing is open at the end remote from the bearings, and a cover comprising inner and outer walls 11, 12 is provided, the inner wall having an annular groove 13. This groove and the bearings are in axial alignment but are eccentric to the axis of the working cylinder. The barrel wall has slots 14 in which cylindrical bearing members 15 can oscillate, and vanes 16 are slidably arranged in slots in said members. Three vanes are shown but more may be used if desired. The cylindrical bearings are inserted through holes 17 in the end wall 6 so that the other end seats into holes 18 in a continuous end ring portion 19 of the rotor barrel. Both ends of the barrel are thus peripherally continuous.

The cylindrical bearing members and a centre spindle 20 upon which the vanes are mounted by means of the intercalating eyes 21 may be of different material from the main part of the pump, but the rotor, vanes and the casing may be of the same material or different materials having approximately the same co-efficients of expansion. For example, the said bearing members may be of hardened steel and the rotor, vanes and casing of an aluminium or nickel-aluminium alloy. This use of the same material for said parts is facilitated if lubricant can be freely supplied to the pump, as it can be when an efficient oil separator is provided in the path of the air discharged by the pump as hereinafter described. As a more specific example of the materials which may be used, the slotted cylindrical bearing members and the centre spindle may be of case-hardened steel to the Air Ministry's specification S. 14 or S. 15, the vanes of an aluminium alloy, specification 2L.40 and the rotor and the casing of Ceralumin B, D. T. D. 287. As another example the rotor and vanes may be of Hiduminium forgings, specification R. R. 59, the centre spindle and the cylindrical bearing members of hard bronze or hard steel and the casing of a Hiduminium casting.

The outer wall 20a of the annular groove 13 in the inner end wall is made of such diameter, as also is the cylindrical wall 22 at the other end of the casing, that the rotor barrel is inserted with a push, or a running fit therein, and these cylindrical walls do not participate in the support of the rotor, between which and the said cylindrical walls continuous fine ring clearances are permanently maintained (at any rate once the pump has been run in), but the rotor is wholly supported, both radially and against end thrust by the two deeply recessed ball bearings 8 and 9, the inner one of which is located as near as possible to the end wall of the rotor barrel and the outer bearing being near the remote end of the rotor shaft.

The outer dimension of the large bearing is chosen so as to allow the latter to pass by the cylindrical wall 22 of the opening which receives the corresponding end of the barrel and to make a driving fit with the adjacent cylindrical wall 23 of smaller diameter. The interior of the casing extension is further shouldered down to allow the outer race of the smaller bearing to pass freely and to make a driving fit with another cylindrical wall 24 of suitable diameter. The shaft of the rotor is also shouldered down at 25 to allow the inner races to be accurately assembled thereon. A spring ring 26 engages in an annular groove 27 in the shaft and retains the bearings and associated spacing means 28 in position on the shaft. A conically headed screw (as described in my aforesaid application) may be used if desired for positively locating the outer bearing race axially. By forming the rotor shaft as an integral part of the rotor and the extension as an integral part of the casing (although this is not essential) I avoid at this end of the pump jointing which would render accuracy of assemblage more difficult and with the construction of the casing described, I may very accurately align the rotor barrel with its bearings and the cylindrical walls in the casing extension. Fine transverse or diametrical clearances are preferably obtained with the aid of the shims hereinafter described. One or more liners may be inserted into the casing extension if desired. For example, it is convenient to fit the outer race of the smaller bearing in a shouldered liner 29.

From the foregoing description it follows that when the pump is in normal working condition the rotor is radially supported solely by the bearings. Between the outer surface of the end wall of the rotor barrel and the adjacent end of the inner race of the larger ball bearing, shims 30 and 31 are provided the former serving to retain the cylindrical bearing members in the rotor wall against endwise movement. These shims prevent the rotor, particularly due to pressure on the end wall of the barrel, from pressing against the outer race of the larger ball bearings. End thrust is in fact taken by the ball bearings, the rotor being kept out of contact with the casing except through the ball bearings.

While the support of the rotor is entirely removed to that portion beyond the end wall of the barrel the clearances should be as fine as possible since they are to act as throttle closures to reduce the leakage to the smallest amount possible, I therefore prefer in manufacture to work to Newall push fits in the assemblage of the parts so that the actual clearances are produced in the course of running in the pump. When these clearances are thus established it is ensured that they are of an extremely fine and lasting character and greatly contribute to countering undue leakage. The provision of ball bearings at opposite ends of the barrel itself would make it practically impossible to produce efficient seals for the purpose. On the other hand to use co-operating cylindrical surfaces to support the rotor barrel would involve undue friction and heat and would lead to such enlarged clearances in running that the pump would become extremely inefficient for its duties. By removing the support to the rotor shaft I have the choice of bearings and this is for combined radial and end thrust ball bearings as described. The vanes must be supported against endwise displacement but as this is effected between the ends of the vanes and the ends of the slots in the rotor the relative travel per revolution at this zone is small in relation to that which occurs between the vanes and the end walls of the chamber so that as compared with the friction which would ensue if contact between such latter parts were permitted friction due to the endwise location of the vanes is small. The vanes are of light weight compared with the rotor and being borne by the stiff central spindle do not give rise to any problem of heating and wear comparable to that which would be set up by using the cylindrical surfaces surrounding the end peripheral portions of the rotor barrel as supporting bearings. The hinge eyes of the vanes may have initially a Newall push to running fit on the spindle. The hinge eyes are brought close to the inner periphery of the rotor barrel as the smaller the distance between the eyes and such periphery the greater is the volumetric efficiency of the pump.

As the vanes are provided with intercalated spaced hinge eyes which encircle the overhung portion of the spindle 20 and the latter is secured in the end walls of the casing the vanes are prevented from centrifuging and pressing against the cylindrical wall of the pump chamber and the stiff spindle resists strongly tendency to distort. The slots in the rotor barrel do not extend to the ends of the barrel but are closed at each end so as to leave the barrel with integral and uninterrupted end ring portions 32 and 19 which greatly conduce to obtaining true cylindricity and those continuous fine ring-clearances between those parts of the barrel and the walls of the annular groove and the casing extension respectively.

The pump may be constructed as in my copending application Serial No. 275,454, dated May 24, 1939, to facilitate the assemblage of the vanes.

Although I may employ a pump having a hollow barrel rotor with the vanes passing through slotted cylindrical bearing pins in the barrel wall, using only the crescent-shaped chamber between the barrel and the cylinder wall, it is of great advantage for the purpose of my invention that the pump should be so constructed that the interior of the rotor is also used as a working chamber because this enables me not only very considerably to reduce the size and weight of the pump but also to obtain a greatly improved cooling action on that part of my pump where heat is likely to be generated, viz., where the vanes pass through the wall of the barrel.

For this purpose the inner and outer walls closing the open end of the casing are appropriately ported and recessed respectively to co-operate with the working chambers of varying volume which are formed in the interior of the rotor. The annular chamber between such walls is separated by webs 34 and 35 which form conduplicated recesses 61, 62 and 61a, 62a. The inner wall is formed with four ports 70, 71, 72, 73 which are disposed across the wall so that the two ports 71 and 72 lie within an area corresponding to the space inside the rotor barrel, and thus communicate therewith, while the other two ports 70 and 73 lie outside the groove 13 in the inner wall and the outer peripheral wall of the rotor barrel and communicate with the space outside the rotor barrel. The pairs of ports may be separated from the groove by concentric arcuate walls so as to leave the cylindrical walls of the annular groove 13 uninterrupted. Although it is still advantageous to have a fine clearance between the end ring face of the rotor and the bottom of the annular groove so as to provide an additional fine throttling seal, this is not then essential.

Each of the outer ports 70 and 73 of the inner wall register with one end, viz., 61, 62a of the corresponding conduplicated recess while each of the inner ports 71 and 72 of the said inner wall registers with the corresponding opposite ends 61a and 62 of such recesses.

In one direction of rotation of the rotor, one outer port and one inner port in the inner end wall serve as suction ports and the other two ports serve as the discharge ports. The two suction ports may lead to a common inlet passage in the pump casing and the other two ports to a common outlet passage, but I have chosen for the purposes of illustration an alternative porting system which enables me to use the apparatus irrespective of the direction in which the rotor is to rotate. For this purpose two ports 3 are provided (see Fig. 3) which are selectively usable as the suction port and two discharge ports 4 are provided which are selectively usable, as a discharge port.

In accordance with the present invention, these ports 4 lead to an annular passage 36 which is formed between the two ball bearings and around the rotor shaft and from the end of the passage near to the bearing remote from the rotor barrel a common radial discharge outlet 37 is provided.

In this passage 36 an oil separator device is introduced which enables the air to be delivered from the outlet 37 practically free from oil and which enables the separated oil to be collected.

This separator, in the form illustrated, comprises a series of ring plates 38 which are clamped between ring members 39 which together build up the outer wall 40 of the passage and are held together by bolts 41. The ring members are preferably stepped at 42 so as to interfit, and the end members may have a frictional fit in the casing or a pinching pressure may be applied externally in order to ensure that no rotation of the members takes place. The ring plates 38 are punched with multiple holes 43, which may be in concentric series or otherwise arranged, and the holes are preferably punched out in the direction of the working chamber so as to provide sharp edges which facilitate the separation of the oil from the oncoming oil-laden air. It is advantageous to arrange the holes differently in the different ring plates. The inner periphery of each ring plate makes as fine a clearance with the rotor shaft as is practicable so as to prevent the oil from bye-passing the sharp-edged perforations. In order to elongate the path of the oil through the separator, the ring members other than the end members, extend inwards towards the shaft and provide local restrictions 44 in the passage and it is of advantage to widen the inner edge of each of these ring members to form tubular rings 45, the inner wall of which is preferably flared outwards at each end, as shown at 46. The outer surfaces of the rings may be made to form annular grooves 47, which help to trap the separated oil. The passage is also provided with a restricted inlet 48, which may be an annulus but is preferably formed by a series of holes (see Fig. 5) in a web portion 60 between the ring member and an inner ring extension 61. The perforations may be so staggered over the whole surface of the ring plates or over a local part thereof, e. g., over the outer part, that the air cannot take a straight path through the annuli formed by the tubular rings 45. The total area of the perforations in each plate is made equal to or greater than the delivery capacity of the apparatus.

In the alternative form shown in Fig. 4, the ring plates are dished so as to deflect the oil-charged air outwards over the projecting walls of the perforations.

Appropriate means are provided for draining the separated oil, and in the apparatus shown a series of radial passages 62 lead to an annular chamber 63 around which any suitable number of drains 64 are provided of which, regardless of the angular position in which the apparatus is arranged, one drain will always be in a suitable position to allow the oil to drain off, if desired through a pipe connected to the drain or a valve, e. g., an interchangeable jet outlet or a needle valve and advantageously by way of a filter. The devices shown in Figs. 4 and 6 of my co-pending application, Serial No. 275,453 dated May 24, 1939, may be placed in the drains. A properly regulated valve prevents substantial loss of pressure from the passage 20 and inflow into the passage of gases from the engine (when the oil separated is returned to the engine). A non-return valve may be desirable which is responsive to back pressure or pulsations of the latter gases.

The relative sliding movement between the vanes and the rotor which is produced during the rotation of the pump generates chambers of increasing and decreasing volume both inside and outside the rotor, each of the outside chambers being defined by any two adjacent blades, the outer periphery of the rotor and the inner periphery of the pump casing and each inside chamber being defined by any two adjacent blades, the inner periphery of the rotor and the outer periphery of the hinge eyes of the vanes. In a three bladed pump the maximum divergence of the vanes is when two adjacent vanes make about 180° with each other and the minimum divergence is when they are at about 90° to each other. When the former position has been reached the leading vane commences to open the outer discharge port and the inner suction port in the inner end wall and the trailing vane has just cut off the outer suction port and the inner discharge port.

As any two vanes close towards each other from the position of maximum angularity, the chamber they generate outside the rotor diminishes in volume and the chamber they generate inside the rotor increase in volume whereby air is expelled from the outside chamber through the outer discharge port in the inner end wall and is drawn into the inside chamber through the inner suction port in such wall. Simultaneously the trailing vane of such pair and the next vane in the direction of rotation of the rotor generate a chamber outside the rotor which is increasing in volume and a chamber inside the rotor which is decreasing in volume whereby air is drawn into the outside chamber through the outer suction port in the inner end wall and is expelled from the inner chamber through the inner discharge port in such wall.

The air is discharged from the working chamber by way of one of the ports 4, the passage 36 containing the separator and the outlet port 37. Oil which is carried through the passage 36 is therefore separated from the air. This oil is that which has been forced into the working chamber by way of the inlet 50, passage 51, regulating device 52, duct 53 and the annular clearance 54 from which the oil passes as a mist into the working chamber or passes along ducts 55 to the valve spindle and bearings.

When the bearings 8 and 9 are mounted on the shaft of the rotor and are separated by the spacing means 28, the inner bearing being spaced from the end wall of the rotor barrel by the aforesaid shimming means 30 and 31 and the inner race of the outer bearing being held by the aforesaid spring ring 26, the whole rotor unit with the bearings is entered into the casing and since the vanes as before described are axially located in the rotor barrel by means of the ends of the slots in the wall thereof a shim 56 interposed between a diametral wall in the casing extension and the outer race of the outer bearing determines the clearance which those end edges of the vanes which are disposed at the shaft end of the rotor have with the corresponding end wall of the pumping cylinder. Shims 57—58 between the inner and outer walls on the one hand and between the outer wall and the casing on the other, the former being appropriately ported to register with the ports in the inner wall, determine the fine clearance between the other end edges of the vanes and the adjacent end wall of the pumping cylinder and between the end ring wall of the rotor and the bottom of the annular groove in the inner wall. These clearances are preformed, i. e., they are not formed during the running-in of the pump although the clearance between the outer longitudinal edge of the vane and the wall of the pumping cylinder is preferably formed during the running-in operation.

I generally keep the clearance within the limits of from ¼ to 1½ mils. or thereabouts.

The rotor with its bearings and the pump casing form a unit in which the shaft portion of the rotor is borne both radially and against end thrust. The whole pump can therefore be readily fitted to a shaft by which it is to be driven, e. g., the shaft or a lay shaft of an electric motor or the shaft or a lay shaft of the engine or of a turbine driven by the exhaust gases, the pump preferably including a coupling element connected to the rotor shaft by a flexible coupling. The rotor is therefore properly borne both radially and against end thrust in the pump casing, the pump being a completely operative unit in itself so as to be readily adaptable to existing equipment. In other words, I do not rely on bearings on the motor or engine or the like, to support the rotor either radially or against end thrust.

Appropriate devices may be incorporated for sealing the interior of the pump from the engine or motor, e. g., means described in my co-pending application No. 373,559 dated January 8, 1941, and the pump may be lubricated by the means described in my application Serial No. 275,453 dated May 24, 1939.

Although I have described the particular application of the pump to supercharging the air in the interior of aircraft the pump as herein described may be applied to other purposes.

Where the apparatus is used as a cabin supercharger, a heater may be incorporated for warming the discharged air.

It will be observed that in the pump described, I restrict the pressure areas to where the vanes pass through the rotor wall but effective cooling is possible of the vanes and the cylindrical bearing members firstly by a direct flow through the working chamber of the main body of air displaced by the pump, and secondly by the continuous flow of air through the inside of the rotor barrel so that not only does the use of the inside of the rotor as well as the outside give considerably greater capacity for a given size and weight than pumps of this kind which have hitherto been designed with the working space confined to the outside of the rotor barrel, but the air being displaced within the rotor barrel has valuable cooling properties and serves to distribute the lubricant effectively. In carrying the invention into practical effect, the open end of the rotor may be initially inserted into the annular groove with a push or running fit, the peripheral portion of the other end of the barrel likewise being inserted with a push or running fit into the corresponding cylindrical wall of the casing. I may utilise allowances according to classes P to Z of Table III of the Newall Engineering Company. I prefer to start with push fits so that the clearances are established in running in the pump as then the finest clearances I can obtain are made available.

To achieve the fine clearances the invention requires, the pump must be constructed with great precision and the pump hereinafter described is built with this especially in view. It will be found that diametral location of the parts is, wherever possible, achieved by closely fitting co-operating cylindrical surfaces which can be machined with accuracy and that means of adjustment to secure the transverse clearances form important details of the pump. Some of the important constructional features of the invention which contribute to the desired precision and are all embodied in the preferred form pump hereinafter described are (a) the rotor is provided with an integral open end as distinguished from the known pump having the aforesaid characteristics in which the rotor has been slotted from that end to receive the cylindrical bearings and the slots subsequently closed by a retaining ring; this removes the difficulty of ensuring that in retaining, e. g., by a retaining ring, the tongue-like parts of the rotor produced by such open-ended slotting against the natural tendency to spring outwards and distort laterally, they will be brought into position to preserve perfect cylindricity, a difficulty especially present when the retaining ring has been attached by multiple screws; (b) the shaft of the rotor is an integral projection of the end wall of the barrel of the rotor, e. g., being machined from the solid or being a separate part cast into the barrel part, and is shouldered to provide a length of greater diameter near to the end wall of the barrel, and the extension of the casing which receives the outer races of the bearings is integral with the body of the casing and its inner cylindrical wall is shouldered to provide parts of different diameters, the smaller or smallest being at the end of the extension remote from the working chamber. The advantages of this are, firstly, the shaft and extension of the casing can be machined to true concentricity with the barrel portion of the rotor and lack of concentricity incident to the use of fastening screws or other devices is obviated and secondly, each of the ball races can be secured with the desired driving fit without contacting with the cylindrical surfaces which receive the other races; (c) shims and appropriate clamping means are provided with the aid of which the desired fine diametrical (transverse) clearances between the end walls of the working chamber and the vanes on the one hand and the ends of the rotor barrel on the other can be obtained with especial facility. Finally, (d) the vanes are provided with hinge eyes which embrace the overhung portion of a spindle which projects into the working chamber from one end wall and is as rigidly supported as possible, thereby facilitating the construction of the pump as a precision instrument.

Various forms of anti-friction bearings may be used, or in some cases plain bearings are employed.

The pump may be driven for example by an electric motor or by being geared to the engine or one of the engines of the aircraft or the exhaust gases from the engine may drive a turbine to which the pump is coupled for drive.

It is allowable to bridge each inlet port and the common discharge port by a short internal or external passage or pipe containing a valve and an intermediate outlet so that whichever port is in use as the suction port, by appropriately positioning the valves, the air can be discharged directly through an exit instead of passing through the passage 20 and the separator, or alternatively the valves can be operated to compel the air to reach such exit only after passing through the passage 20. This is especially convenient when the apparatus is to be used for the dual purpose of a vacuum pump for operating instruments and as a pressure pump for operating de-icing equipment, since when the pump is operating the instruments only, the valves can be moved to permit the direct discharge (bye-passing the passage 20) through such exit, whereas when the pump is to operate de-icing equipment, the valves are operated to compel the air to pass through passage 20 and the separator on its way to such exit.

When the direction of rotation of the pump is known, I may use a non-return valve, e. g., the spring valve shown in Fig. 2, in one delivery port and a plug as shown in Fig. 4 in the other delivery port, thereby minimising the liability of leakage past a non-return valve which is never required to be open to the passage 20.

When the direction of rotation is known, one such external tube or pipe may be fitted, and each tube or pipe may have fins which have a cooling action on the discharged air, especially when they are in the slip-stream. If desired, in order to simplify the casting of the casing of the apparatus, and in order to promote the cooling action, short externally ribbed tubes may be attached to the pump casing to form the ports between the working cylinder and the passage 20, or one of such tubes may be fitted if the direction of rotation is known, the casing being appropriately formed to enable such a tube to be readily coupled to it.

The air preferably escapes through the common outlet from the passage 20 by way of apertures in the flange 80 of the sleeve 81, which preferably with the air of outwardly expanding rings 82, seals off the interior of the casing from the engine to which the mounting pad 83 is fixed, without which seal there would be communication by way of the gap between the races of the outer bearing. The flanges at each end of the sealing sleeve may be adapted to yield elastically.

What I claim is:

1. A high speed rotary vane apparatus for delivering a gaseous medium free of lubricant gathered by the medium during its passage through the apparatus, comprising a casing member providing a work cylinder and an elongated laterally extending aperture communicating with the work cylinder adapted to journal a shaft, an open ended rotor barrel rotatable in said cylinder, said barrel having a shaft member of reduced diameter extending from its closed end into said elongated aperture, the closed end wall of said barrel effectively closing off communication between said work cylinder and said laterally extending aperture, axially spaced anti-friction bearing means in said elongated aperture for journaling said shaft whereby the said rotor barrel is rotatably supported cantilever fashion in said work cylinder, vane members in said work cylinder coactively related with said rotor barrel and with said work cylinder to deliver gaseous medium on rotation of the barrel, a conduit for conveying the medium from the work cylinder around said closed end of the barrel and into one end of the space between said axially spaced journal bearings, a delivery conduit communicating with the other end of said space between said axially spaced bearings, and means in the space between the axially spaced bearings for removing lubricant gathered by the medium during its passage through the work cylinder.

2. An apparatus as set forth in claim 1 including means for closing the elongated aperture in the casing at the end thereof remote from the cylinder except for said delivery conduit and the space between the races of the adjacent bearing, and means for sealing said last mentioned bearing against egress of gaseous medium therethrough.

3. An apparatus as set forth in claim 1 including relatively stationary baffle means in said space between said axially spaced journal bearings past which the gaseous medium flows during its passage through the said space to said outlet conduit.

4. The combination set forth in claim 1 in which said casing is provided with a chamber adjacent said space between the bearings for collecting the liquid separated out of the gaseous medium during its flow through said space, and a separate conduit in the casing communicating with the said chamber for conducting the collected liquid away therefrom.

FRANK CHRISTIAN FULCHER.